(12) United States Patent
Emile (10) Patent No.: US 11,006,700 B1
(45) Date of Patent: May 18, 2021

(54) CLIP

(71) Applicant: Jean Emile, Richmond, VA (US)

(72) Inventor: Jean Emile, Richmond, VA (US)

( * ) Notice: Subject to any disclaimer, the term of this patent is extended or adjusted under 35 U.S.C. 154(b) by 0 days.

(21) Appl. No.: 16/865,459

(22) Filed: May 4, 2020

Related U.S. Application Data

(63) Continuation of application No. 15/906,792, filed on Feb. 27, 2018, now Pat. No. 10,681,965.

(51) Int. Cl.
*A44B 17/00* (2006.01)
*F16B 5/06* (2006.01)

(52) U.S. Cl.
CPC ........ *A44B 17/007* (2013.01); *A44B 17/0023* (2013.01); *A44B 17/0041* (2013.01); *F16B 5/0642* (2013.01); *A44D 2201/04* (2013.01); *A44D 2201/12* (2013.01)

(58) Field of Classification Search
CPC .............. A44B 17/007; A44B 17/0023; A44B 17/0041; A44B 2201/04; A44B 2201/12; F16B 5/0642
See application file for complete search history.

(56) References Cited

U.S. PATENT DOCUMENTS

| | | | | |
|---|---|---|---|---|
| 1,270,494 A | * | 6/1918 | Christiansen | B60P 7/0823 24/302 |
| 2,937,834 A | * | 5/1960 | Orenick | F16L 3/14 248/71 |
| 3,144,695 A | * | 8/1964 | Budwig | F16L 3/2332 248/60 |
| 3,275,969 A | * | 9/1966 | Sheeran | H02G 11/003 439/451 |
| 3,465,992 A | * | 9/1969 | Schuplin | F16L 3/233 248/71 |
| 5,599,148 A | * | 2/1997 | Hirose | B60N 3/046 411/112 |
| 6,394,695 B1 | * | 5/2002 | Chausset | B60R 21/216 248/71 |
| 7,832,064 B2 | * | 11/2010 | Nessel | F16B 5/065 24/297 |
| 8,316,514 B2 | * | 11/2012 | Sano | B60R 13/0206 24/297 |
| 2005/0285374 A1 | * | 12/2005 | Kawai | B60R 21/215 280/728.2 |
| 2005/0285375 A1 | * | 12/2005 | Kawai | B60R 21/215 280/728.2 |
| 2008/0028577 A1 | * | 2/2008 | Soman | F16B 21/075 24/293 |
| 2008/0235919 A1 | * | 10/2008 | Giddings | F16B 5/0657 24/289 |
| 2012/0060328 A1 | * | 3/2012 | Rohrig | A45F 5/02 24/3.12 |
| 2012/0279019 A1 | * | 11/2012 | Cassaday | B42F 1/06 24/67.5 |

* cited by examiner

*Primary Examiner* — Robert Sandy
*Assistant Examiner* — David M Upchurch
(74) *Attorney, Agent, or Firm* — Blank Rome LLP (57) ABSTRACT

A clip having superimposable parts for securing, between the parts, thin pliable materials, at any locations on the material, adjacent the material edges or at any position between opposing material edges.

15 Claims, 11 Drawing Sheets

CLIP

CROSS REFERENCE TO RELATED APPLICATIONS

This application is a continuation of U.S. patent application Ser. No. 15/906,792, filed Feb. 27, 2018, which is herein incorporated in its entirety by reference.

BACKGROUND OF THE INVENTION

The use of clips to retain and hold objects in place is very common and has been well exploited over the years. General mechanisms in building a clip involve folding or twisting a piece of certain material over itself to generate resistance and create a catch area where objects are trapped and secured, such as paper clips, binder clips, etc. Generally, these types of clips require a leverage mechanism to open the catch area to insert the objects/items to be held.

Other types of clips designs entail the introduction of various types of springs that can exercise pressure on the reverse side of each part of the clip. This process produces a relative response within the contact area inside the clip allowing it to grasp and hold on to objects, such as clothespins.

In both the cases, however, opposing sides of the clip must constantly and resiliently be attached together because taking them apart may ruin the apparatus or compromise the clips integrity. In addition, the dimension of the clips, such as binder clips and clothespins can only grab and secure objects/adjacent the perimeter of the objects to be held together. When reaching beyond the perimetric edges of the object is a necessity, other solutions are necessary, such as fabric pins or other mixed techniques. However, this approach produces results and outcome that are often negligible, poor, not desirable and at times dangerous. For example, fabric pins are much like needles; they usually have one blunt extremity and another extremity that is sharp by design which can cause injury if not handled with dexterity and vigilance.

Conventional clips and their applications, though widely popular, lack many desirable features. For example, with fabric material, a line or rod is used over which the material is folded, placed or laid before applying the clip, but the support system must not exceed a certain thickness. Otherwise, if that consideration is neglected, the corresponding clip may fail or only produce a loose bite; not strong enough to retain objects. Further, clothespins and other fabric clips are practically useless beyond the perimeter or border of an object because, if separated, the parts become faulty and will not work properly. This deficiency imposes the need for considering fabric pins as complement even though in some cases they pose functionality and safety concerns. Additionally, clothespins and fabric clips are not versatile enough and thus not built with the intention of reaching the central areas of the objects or items to be held together. These limitations and drawbacks are overcome with the clip in accordance with the invention described below.

SUMMARY

The present invention relates to clips having superimposable parts, which securely retain objects, such as thin, natural or synthetic manufactured materials, e.g., textiles, fabrics, cellulosic products such as paper, polymeric films, or other material, from virtually anywhere within the dimensions of the objects.

The present invention relates to a kit having top and bottom parts for assembling by a user to secure, between the parts, thin pliable materials, at any locations on the material, adjacent the material edges or at any position between opposing edges.

The present invention relates to a system having top and bottom parts, optionally flexibly tethered to one another by a flexible link/tie, for securing materials, at any location on the material that is either adjacent to the material edges or at any location between opposing edges of the material.

In one embodiment of the invention, top and bottom clip parts are provided, respectively having protruding connectors which can be received within one another, and form a space there between for receiving and securing material, such as textile, cellulosic or synthetic sheet material, at any locations on the material, adjacent to the material edges or at any position between opposing edges of the material.

The present invention relates to a method of securing thin materials by providing a clip system or kit in accordance with the invention.

The present invention relates to a method of securing materials together by arranging a stack of materials, locating the stack of materials to be secured between parts of the clip system or kit, and engaging connectors of the parts with the material to secure the materials.

In another embodiment of the invention the clip parts are discrete and separable, but respectively include connectable members, which when forced together, are concentrically arranged, one part-has an independent front side and the other part has an independent back side, and the connectable members, in a superimposed relationship, are capable of being pushed together and locked, or, optionally tethered together or float completely free from the other when not assembled.

In a further embodiment of the invention one part of the clip, optionally includes a tethered security cap.

In another embodiment of the invention, an independent front side of the clip forms one of the clip members or parts, and an independent backside of the clip forms another of the clip members, where the clips members/parts are substantially planar, each having outer and inner major surfaces, and each bearing at least a substantially annular connector respectively forming a chamber.

In accordance with a still further embodiments of the present invention, the back side member of a clip component is placed behind the textile material or other material so that a major surface of the clip component is placed against one side of the material, and the front side member of another clip component, with its major surface, is placed on the other side of the material, one clip components is pressed from above until the connectors associated with each clip component catches and engages the other clip component to secure the textile, cellulosic or synthetic material into desired position between the clip components.

DETAILED DESCRIPTION

The following detailed description presents certain embodiments to illustrate the inventive concepts, but which are meant by way of example only and are not intended to limit the scope of the invention in any manner.

An attribute for a clip in accordance with the invention is to provide retention for objects inserted between the two parts of the clip. The clip's configuration, retention type and grade are generally based on specific use which in turn determines the type of material entering in the constitution or makeup of the clip. For example, while maintaining the same functionality, a clip purposed to hold together a stack of perforated paper may differ in some respects from embodiments where the clip will hold items formed from chain links, such as jewelry chains, or multiple belts, by extending through belt buckles or through eyelets in certain pieces of clothing. In some embodiments, the two sides of the clip can be completely detached while in others they may be linked, e.g., tethered together, thereby providing a considerable degree of autonomy to facilitate functionality.

In other embodiments, connector chambers of the clip parts may simply lock together through preconfigured spaces and perforations intended to facilitate securement and linkage of multiple segments and various areas of an operation. The size and strength of the chambers are in compatibility with the type of project and desired outcome. The mechanism of the clip exhibits features and techniques adaptable to different settings ranging from domestic functions to industrial applications.

The characteristics of the clip allow for working gently with textiles and families of products, as well as, those exhibiting similar properties like in some plastic and vinyl products which are capable of being trapped and clamped between the two sides of a clip for retention and security considerations. The clip comprises one top half member or part and one bottom half member or part that come together to secure and retain materials and objects positioned between the components parts.

Generally, the clip in accordance with the invention, includes a top part and a bottom part. Each part has a body with upper and lower major surfaces, and a component/connector of an engaging mechanism. The body is generally elongated in shape with rounded corners for distal and proximal ends to protect the material to be secured. The body of the top part includes circular opening that extends through the entire thickness of the body. A locking member is connected, e.g., tethered, to an edge at one end, e.g., the proximal end, of top part by a linking member that is flexible. The locking member can be moved from a first non-locking position to a second, locking position, such that locking member can be positioned above and pushed into the opening in the top part body.

The top part also includes a connector, integral with the body, which is part of the engaging mechanism, and which extends away from a lower major surface of the body and terminates at a peripheral edge that is spaced from the lower major surface. The connector of the top part has an inner diameter corresponding to an inner diameter of the opening, such that an inner wall of the connecter is coterminous with the opening. The connector of the top part is integrally formed with the body. A bottom view of the connector depicts a peripheral edge that is C-shape in cross-section whereas a right side view illustrates a T-shape, having two curved/arcuate side sections extending from a central wall section; the arcuate or curved side section extensions forming resilient and compressible wings. The connector wall forms the engaging chamber of the top part connector. The height of the central section is greater than that of the two side sections, which are arcuate in length and terminate at distal side edges that are spaced from one another, that are movable. The adjacent side sections, being of lesser height than the central section, are only connected to the body of the top part by the central section, and thus have arcuate edges that are spaced from, and out of contact with, the major surface of the body. The wings are formed from a resilient and flexible material such that they are moveable and can be compressed and forced radially inward, but spring back or be urged into place. The arcuate side sections having radially outward tabs at their distal arcuate periphery.

The bottom part includes a substantially planar body having a major and minor axes. The body of the bottom part includes a first portion containing through slots, or other openings, at one end, and a connector portion, which forms a second part of the engaging mechanism. The bottom part connector has an upstanding, annular wall, of circular cross-section, extending away from the top major surface of the bottom part and terminates in a circular peripheral edge.

The outer diameter of the top part connector is smaller in dimension that of the inner diameter dimension of the bottom part connector, and respectively dimensioned, such that material being secured can be placed between the top and bottom parts, and the connector of the top part can be received within the connector of the bottom part.

As will be discussed in greater detail with reference to non-limiting FIGS. 1-7, the main clip components or parts comprise connector chambers that can be in direct contact with and surrounded by the material being retained when such material is thin and soft by nature such in the case of fabric products like bed sheet, curtain, drapes, signs, flags, table cloth, canvass, tarp and various forms of vinyl products such as the ones used in display and for signage as well as other functions not herein counted.

Figure 1A:
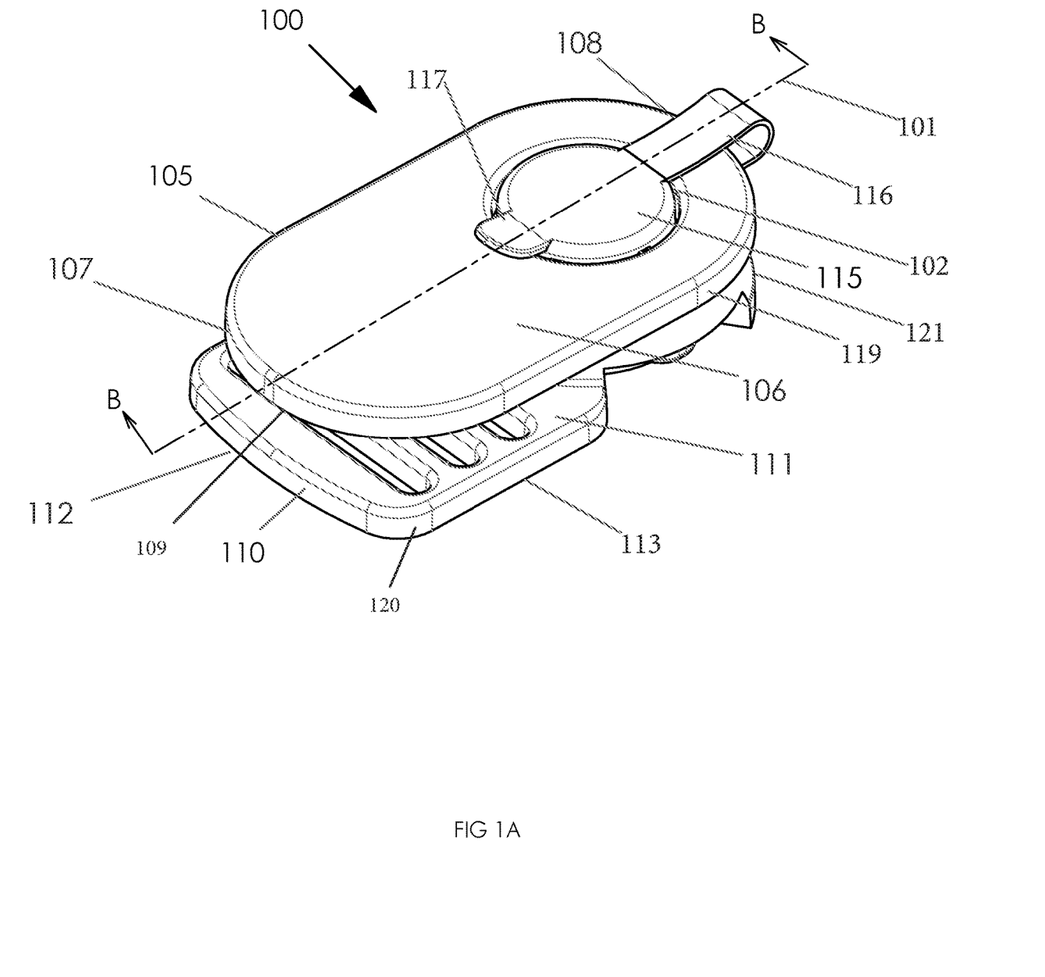
FIG. 1A is a perspective view of a closed clip with a security cap arranged and applied into an engaging chamber of a top clip part in accordance with one embodiment of the invention.

FIG. 1A depicts a top perspective view of an assembled and closed clip 100 with major longitudinal axis 101, a first or top half 105 of the clip with through opening 102, a second or bottom half 110 of the clip 100, a locking mechanism 115, a hinge 116 that links the first half 105 with the locking mechanism 115. The first or top half 105 has a major upper surface 106, a major lower surface 109, a proximal end 108, a distal end 107, and a peripheral edge 119. The second, or bottom half 110, has a major upper surface 111, a major lower surface 113, a distal end 112, a peripheral edge 120 and a proximal end 121. The locking mechanism 115, has a tab 117, and hinge 116. The geometry and shape of the clip's components may vary so long they maintains sufficient capability for retaining objects using those components. Thus, instead of the illustrated, elongated clip, the clip could be rectangular, oval, circular, trapezoidal or triangular in shape.

Figure 1B:
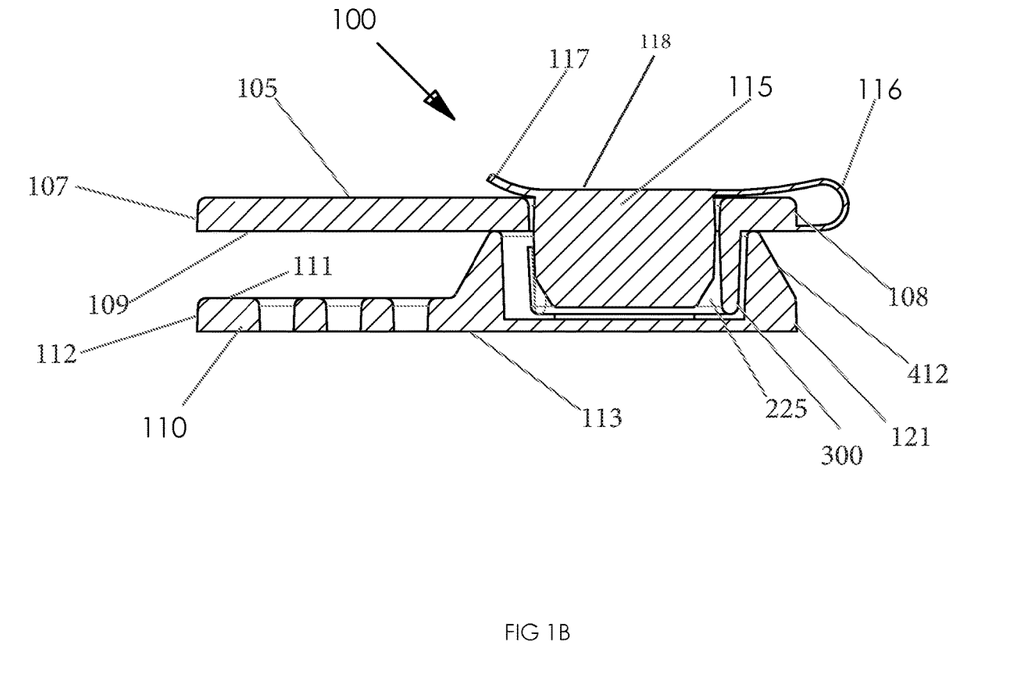
FIG. 1B is cross-sectional view of FIG. 1A along axis B.
Figure 2:
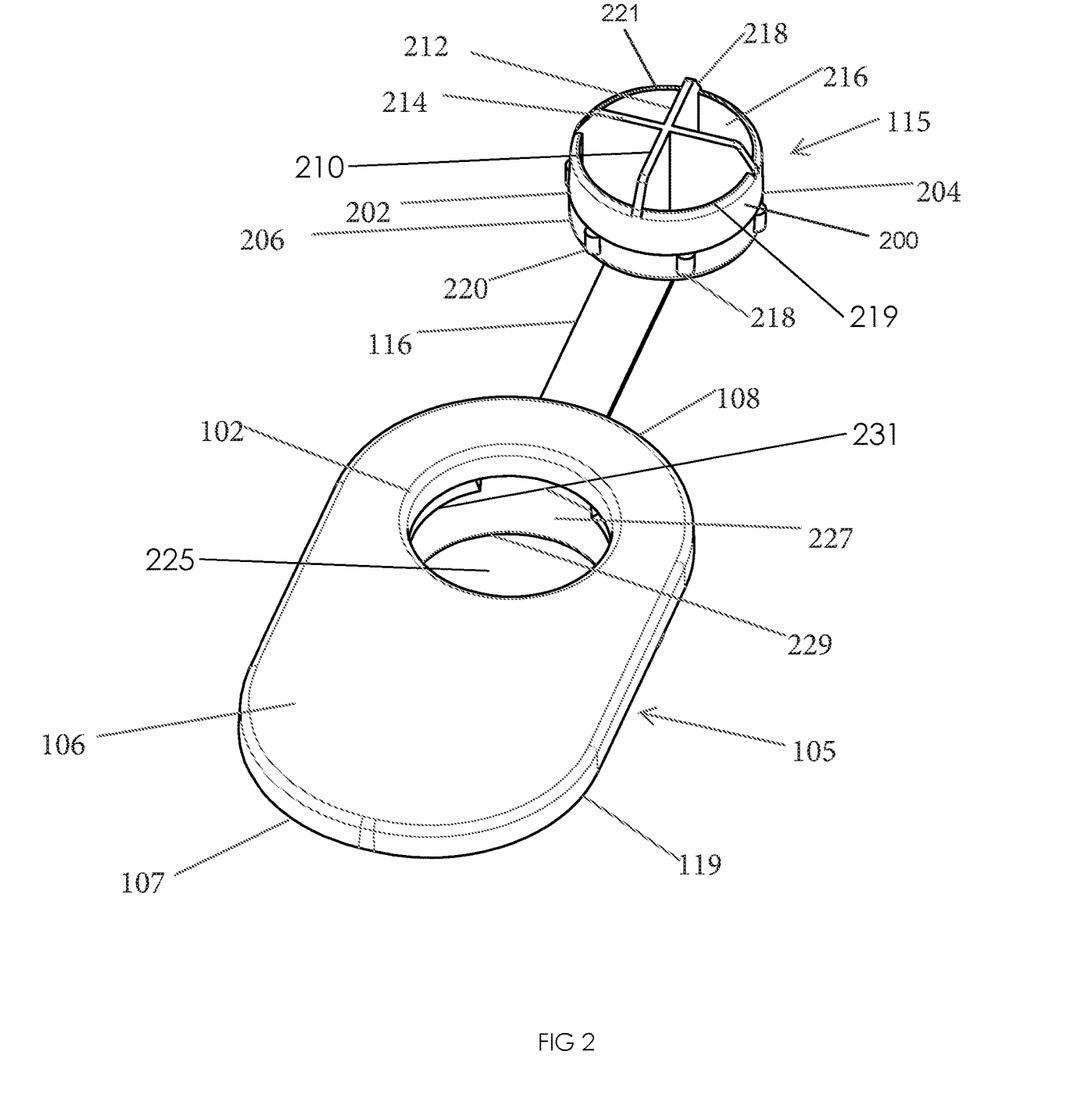
FIG. 2 is a top perspective view of a clip part in accordance with the present invention which shows the front side of the top part of the clip with a security cap in accordance with one embodiment of the invention, and which is attached to the top clip part, in an open, not engaging position, and exposing the interior of an engaging chamber of a connector component.
Figure 3A:
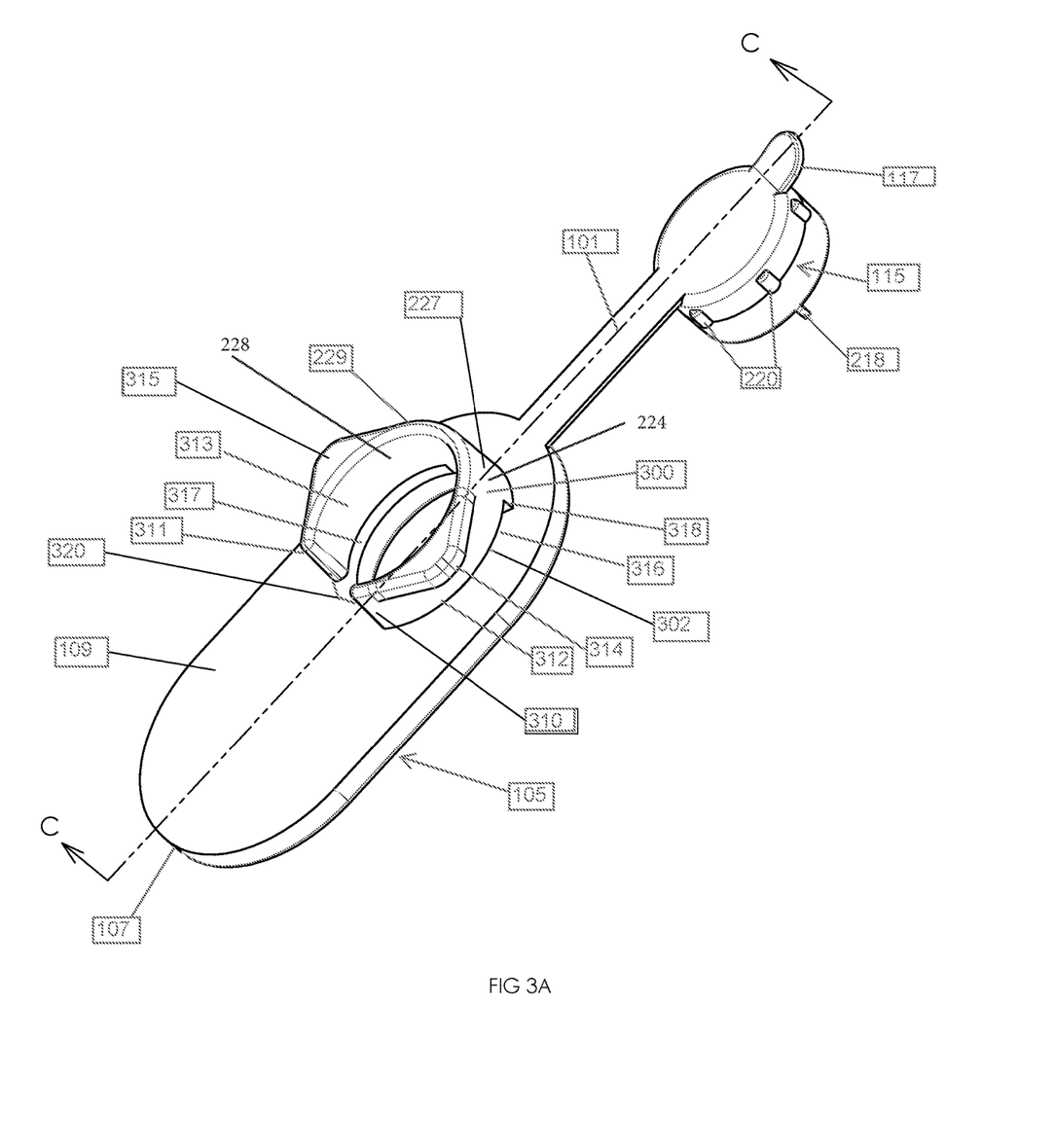
FIG. 3A is bottom perspective view of the top clip part and displays the reverse side of the top part, illustrating the annular wall structure of the connector component of the engaging mechanism and its engaging chamber in accordance with one embodiment of the invention.
Figure 3B:
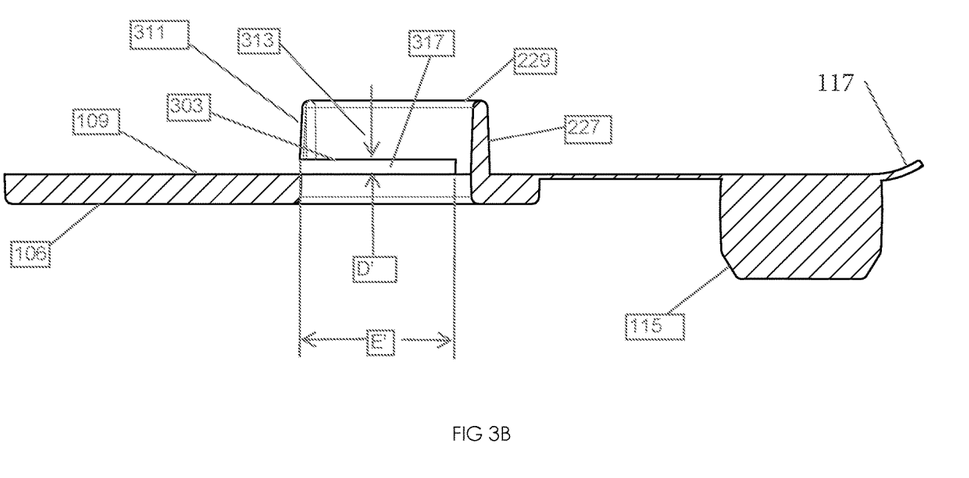
FIG. 3B is a cross-sectional view of FIG. 3A along axis C.

FIG. 1B depicts a cross-sectional view of the assembled and closed clip 100 taken along axis B-B showing first half 105 and second half 110 of clip 100, locking mechanism 115, hinge 116 that links the first half 105 with the locking mechanism 115, and which is received within chamber 225 formed by projection 300, best illustrated in FIGS. 2A, 3A and 3B. The first or top half 105 has a major upper surface 106, a major lower surface 109, a proximal end 108 and distal end of 107. The second, or bottom half 110, has a major upper surface 111, a major lower surface 113 and distal end of 112, and proximal end 121. The locking mechanism 115, has a tab 117 connected to the body 118 hinged to first half 105 by hinge 116.

FIG. 2 is also a top perspective view of a first half of the clip, e.g., the first or top half 105 of the clip 100 which also has distally extending chamber 225, circumscribed by wall 227 which terminate in distal peripheral edge 229, and has proximally located, horizontal cut-outs 231 that extend through the entire thickness of wall 227, best illustrated in FIG. 3A. The first or top half 105 of the clip 100 includes a disengaged locking mechanism 115 formed from a substantially cylindrical wall 200, with a distal section 202, proximal section 206, a distal peripheral edge 204, and proximal edge 221. The open, distally ended internal volume 216 of locking mechanism 115 includes structural rib component 210 formed by intersecting ribs 212 and 214 which respectively extend across the internal diameter of the locking mechanism 115 to reinforce wall 200. The wall 200 of the locking mechanism 115 can be strengthened in various ways, for example, by changing its thickness or incorporating different types or numbers of rib inserts and modifications.

Intersecting ribs 212 and 214 have chamfered distal corners 218 to facilitate insertion of locking mechanism 115 into chamber 225. Proximal section 206 of locking mechanism 115 includes a plurality of circumferentially arranged, vertically extending rib-embossments 220 on its external circumferential surface adapted to frictionally engage the internal surface 228 of wall 227.

FIG. 3A illustrates a bottom perspective view of the first or top half 105 of the clip 100, connector projection 300, circumscribing wall 227 with internal surface 228, external surface 224, and distal edge 229. The wall 227 extends outwardly away from major lower surface 109 at proximal end. Wall 227 is C-shape in cross-section and includes three integral segments, a center section that it integral with and extends vertically from surface 109, and two side sections 312 and 313, that respectively terminate in free and resiliently compressible ends 310 and 311. The three sections have a common distal edge 229. Side sections 312 and 313 have a vertical dimension less than the vertical dimension of the center section and have a proximal edge 302 spaced from surface 109 by distance 318 to form horizontal cutout 316 and 317 near the baseline surface 109, with a vertical height of D' and a length E', best seen in FIG. 3B. The horizontal cuts 316 and 317 intersect space 320 defined by free ends 310 and 311. Projection 300 also includes outwardly extending tabs 314 and 315 that cooperate with cutouts 416 and 417 in chamber section 410 of the second or bottom half 110 of clip 100, best shown in FIG. 4A.

Figure 4A:
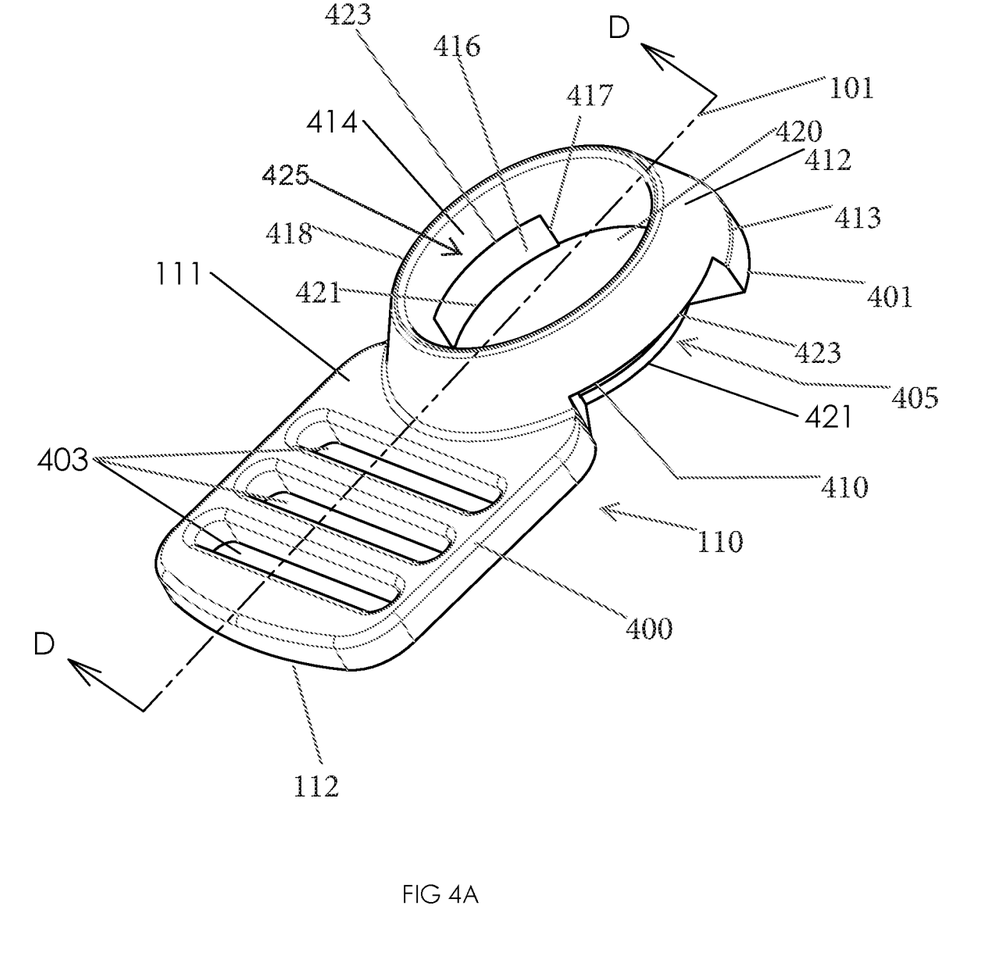
FIG. 4A is a top perspective view of the bottom part of the clip in accordance with one embodiment of the invention, displaying the receiving chamber of a connector component, and the strap insertion spaces.
Figure 4B:
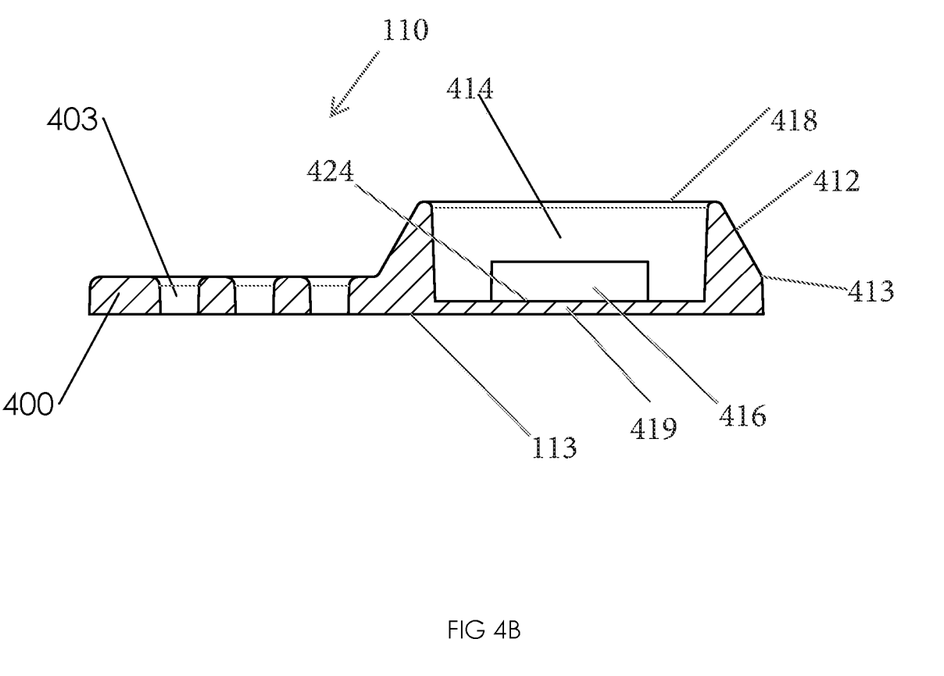
FIG. 4B is a cross-sectional view of FIG. 3A along axis D.

FIG. 4A is a top perspective view of bottom part 110 and includes slot section 400 for receiving a belt, strap or band (not shown), and connector projection chamber section 410 for engaging projection 300 of the first or top half 105 of the clip 100. As shown, section 400 includes a plurality of longitudinally spaced slots 403 that receive a fastening member (such as a belt, strap or band, or any other suitable device or element). The slots 403 are arranged transverse to the longitudinal axis 101. Chamber section 410 includes a base 401 and floor 420 integral with slot section 400 from which truncated section 412 extends from imaginary plane 413 and terminates at a distal, peripheral edge 418. Chamber section 410 has a base 401 with exposed curved edges 421 at its circumferential edges, and an upwardly extending, outwardly flared inner wall 414, through which cut-outs 416 extend. Cut-outs 416 have an upper-distal arcuate surface 423, formed in section 412. Together a cut-out thickness/vertical height 417 is greater in dimension than the thickness of tabs 314 and 315, and an arcuate length 423 is sufficient to receive outwardly extending tabs 314 and 315 when the top and bottom parts 105 and 110 are assembled. Wall 414 and floor 420 define receptacle chamber 425. In FIG. 4B, floor 420 has a thickness 419 lesser in dimension than that of slot section 400.

Figure 5:
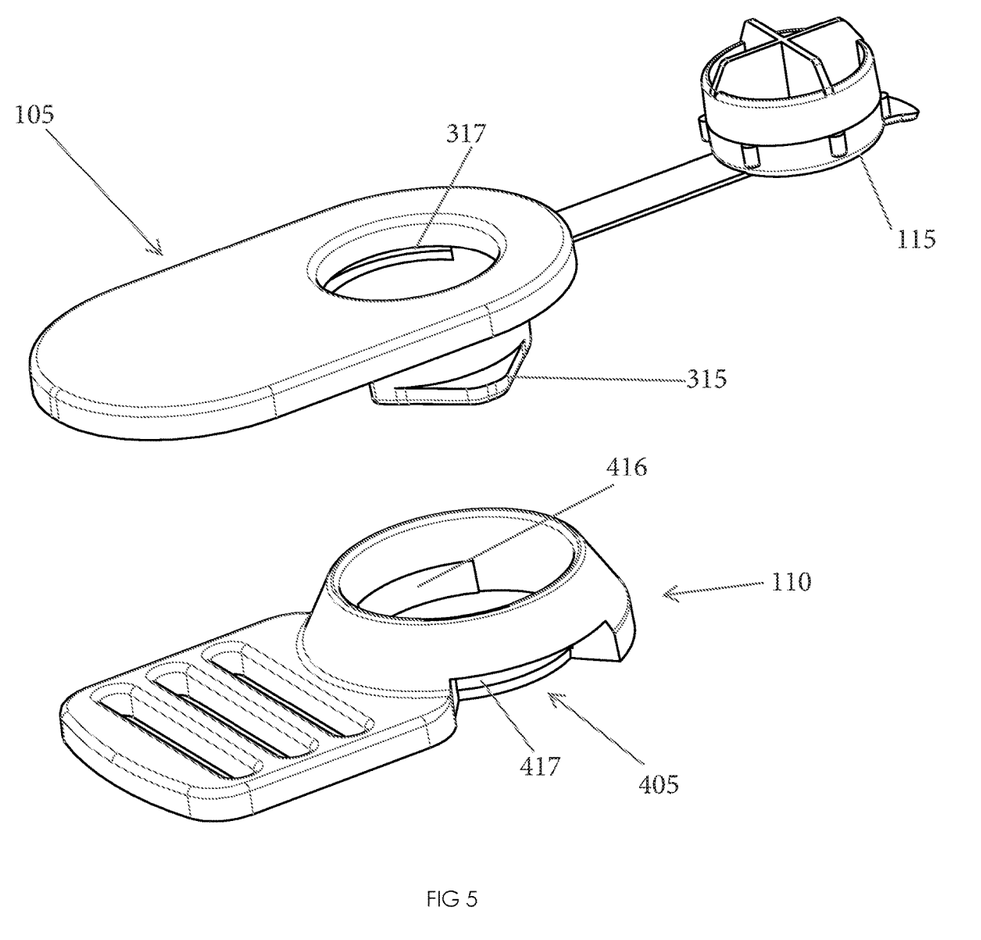
FIG. 5 is an exploded view of the clip kit/clip system in accordance with one embodiment of the invention illustrating the superimposed arrangement of the top and bottom clip parts prior to engagement and assembly.

In the exploded view of FIG. 5, parts 105 and 110 are arranged in the preassembled, superimposed positions such that projection tab can be received in chamber 425 and the tabs, e.g., 315 can be received in cut-out 417. Materials to be clipped together are placed between parts 105 and 110, which are then pushed together to engage the projection from part 105 into chamber 425 of part 110

Figure 6A:
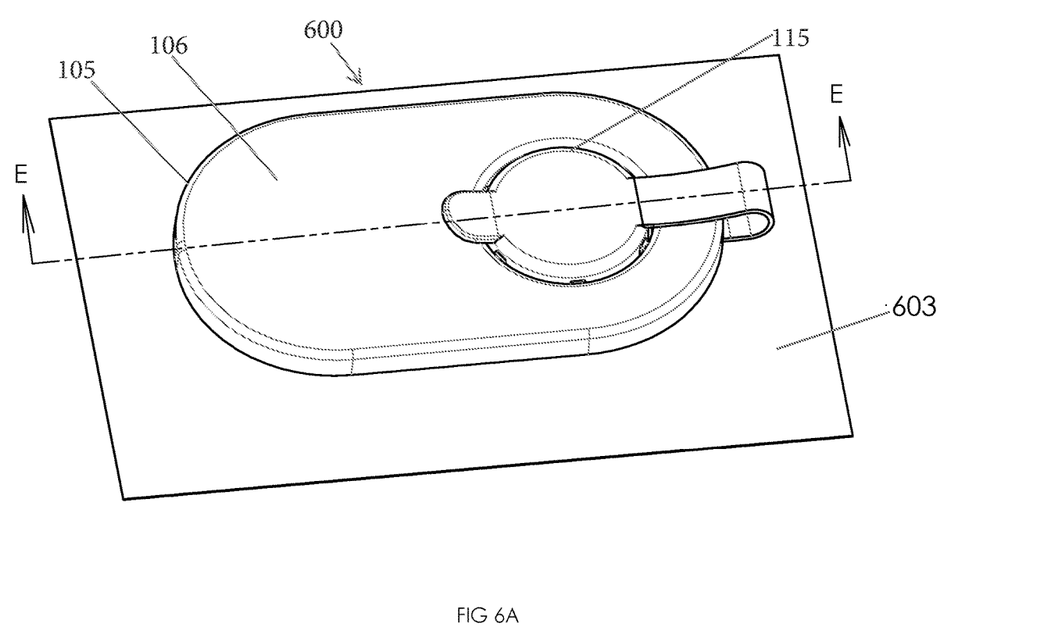
FIG. 6A is a top perspective view of the top surface of clip depicting an object securely fastened in accordance with one embodiment of the invention.
Figure 6B:
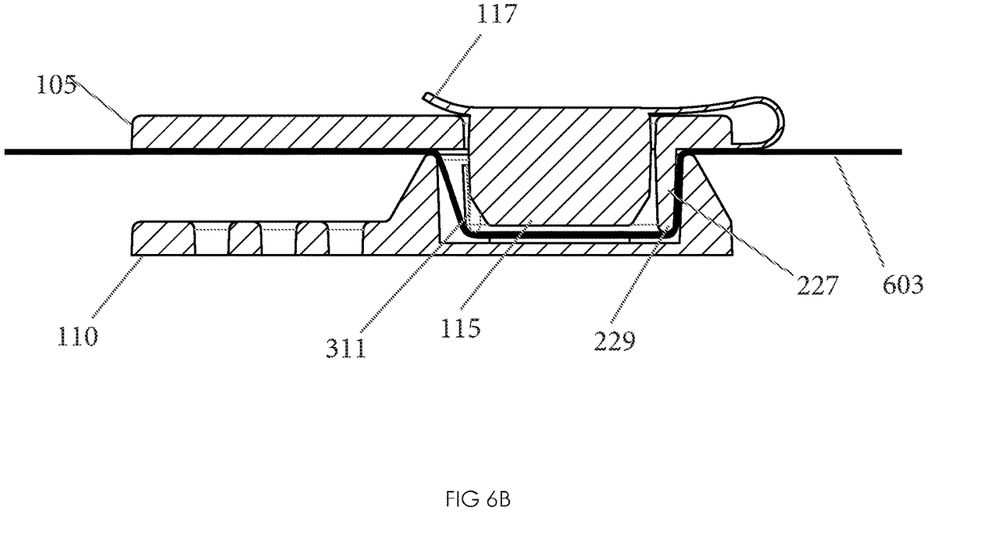
FIG. 6B is a cross-sectional view of FIG. 6A along axis E.
Figure 7:
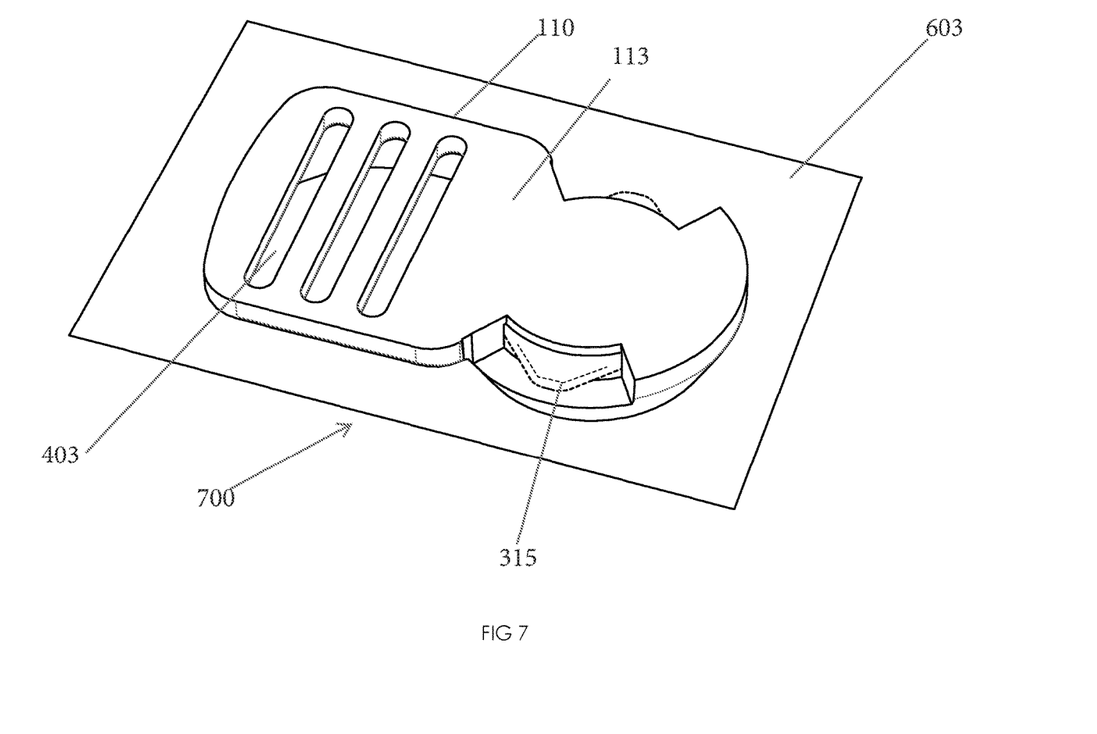
FIG. 7 is a bottom perspective downward view of the back side of the bottom part of the clip showing how the tabs of the engaging chamber of the top part emerges on either side of the cutouts of the bottom part in accordance with one embodiment of the invention.

FIGS. 6A, 6B and 7 illustrate top, side and bottom views where a piece of material 603 is located within and retained by the clip 100. The major outer surfaces of the clip parts 105 and 110 are visible, as is the top of the locking mechanism 115.

FIG. 7 shows the opposite side of a closed clip 100 in operation with material installed. The visible components are the outer surface 700 of the second half 400 of the clip 100 exhibiting the tabs 315 protrude from the cutouts 416 and 417 located within the receiving chamber 405 of the second half 110 of the clip 100.

The invention claimed is:

1. A clip comprising: first and second discrete clip parts, said first discrete clip part having a main body, and an integral, outwardly extending annular connector defining a first chamber and said second discrete clip part having a main body with an integral, outwardly extending, substantially annular connector comprising wall sections terminating in compressible ends and defining a second chamber, said substantially annular connector extending towards and receivable within said first chamber, said wall sections bearing outward protrusions, and said annular connector defining a plurality of arcuate openings configured to receive and retain said protrusions.

2. The clip of claim 1, wherein each of said protrusions is a tab.

3. The clip of claim 1, wherein said annular connector and substantially annular connector are circular in cross-section.

4. The clip of claim 1, wherein one of the first and second discrete clip parts further includes a tethered locking member configured to be inserted into said second chamber.

5. The clip of claim 2, wherein there are two tabs which are capable of unlocking the first and second discrete clip parts.

6. A method of securing a stack of material, comprising locating a stack of material between the discrete clip parts according to claim 1, pressing the inner member into a chamber defined by said outer member and compressing said arcuate side sections which release when the protrusion engages the additional opening and secures the material.

7. The clip of claim 1, wherein said first and second discrete clip parts are superimposable and float completely free from one another when not assembled.

8. A locking member, comprising: a proximal section and a distal section, said proximal section including a closed upper-end, an open lower-end and a plurality of integral ribs arranged on an exterior surface of said proximal section, said distal section, coterminous and integral with said proximal section is open at both ends, said proximal and distal sections defining an internal volume with an internal support.

9. The locking member according to claim 8, wherein each of said proximal and distal sections has a diameter and height dimension, and the height dimension of the internal support is greater than the combined height dimension of said proximal and distal sections.

10. The locking member according to claim 9, wherein the height dimension of the proximal section is less than the height dimension of the distal section.

11. The clip according to claim 4, where said locking member, comprises: a proximal section and a distal section, said proximal section including a closed upper-end, an open lower-end and a plurality of integral ribs arranged on an exterior surface of said proximal section, said distal section, coterminous and integral with said proximal section is open at both ends, said proximal and distal sections defining an internal volume with an internal support.

12. The clip according to claim 11, wherein each of said proximal and distal sections has a diameter and height dimension, and the height dimension of the internal support is greater than the combined height dimension of said proximal and distal sections.

13. The clip according to claim 12, wherein the height dimension of the proximal section is less than the height dimension of the distal section.

14. A method of clipping items, comprising:
   a. providing a clip having discrete, superimposable main body parts and an one of main body parts having an inner member with at least one tab and another of said main body parts having an outer member with at least one wall cut out to receive said at least one tab to facilitate assembly or disassembly of said body parts,
   b. locating one of said inner and/or outer members through items to be held,
   c. pressing one of said at least one tabs to place the inner member into a compressed state,
   d. axially inserting said inner member of step c into said outer member until said at least one wall cut-out is reached whereby one of said at least one tabs is returned to an uncompressed state to retain said main body parts together.

15. The method of claim 14, wherein the inner member and outer members provided in step a respectively define first and second chambers, and the method further comprises:
   e. providing a locking member, and
   f. inserting the locking member into the first chamber of the inner member.

* * * * *